US012000301B2

(12) United States Patent
West et al.

(10) Patent No.: US 12,000,301 B2
(45) Date of Patent: Jun. 4, 2024

(54) SIMULTANEOUSLY DISASSEMBLING ROTOR BLADES FROM A GAS TURBINE ENGINE ROTOR DISK

(71) Applicant: Pratt & Whitney Canada Corp., Longueuil (CA)

(72) Inventors: Robert West, Mississauga (CA); Howard Mah, Mississauga (CA); Sowriraja Krishnasamy, Mississauga (CA); Dean-Andrew Michalagas, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/891,784

(22) Filed: Aug. 19, 2022

(65) Prior Publication Data

US 2024/0060432 A1 Feb. 22, 2024

(51) Int. Cl.
*F01D 25/28* (2006.01)

(52) U.S. Cl.
CPC ........ *F01D 25/285* (2013.01); *F05D 2230/70* (2013.01)

(58) Field of Classification Search
CPC ............... F01D 5/3007; F05D 2230/70; F05D 2230/72; F05D 2230/80
See application file for complete search history.

(56) References Cited

U.S. PATENT DOCUMENTS

| | | | | |
|---|---|---|---|---|
| 9,328,621 | B2 | 5/2016 | Lecuyer | |
| 10,760,434 | B2 | 9/2020 | Kolvick | |
| 2006/0039790 | A1 | 2/2006 | Hartmann | |
| 2010/0162546 | A1* | 7/2010 | Kalmar | F01D 25/285 29/244 |
| 2013/0177429 | A1* | 7/2013 | Bommanakatte | F01D 5/3053 29/889.21 |
| 2014/0304989 | A1 | 10/2014 | Lecuyer | |
| 2017/0298778 | A1* | 10/2017 | Twell | F01D 5/3007 |
| 2018/0073399 | A1 | 3/2018 | Batt | |
| 2022/0235675 | A1 | 7/2022 | Pilichowska | |

OTHER PUBLICATIONS

EP Search Report for EP Patent Application No. 23192271.7 dated Feb. 5, 2024.

* cited by examiner

*Primary Examiner* — Christopher J Besler
(74) *Attorney, Agent, or Firm* — Getz Balich LLC

(57) ABSTRACT

A method is provided for disassembling a rotor of a gas turbine engine. During this method, the rotor is provided which includes a rotor disk and a plurality of rotor blades arranged circumferentially about an axis. The rotor blades include a plurality of airfoils and a plurality of attachments that mount the rotor blades to the rotor disk. Each of the rotor blades includes a respective one of the airfoils and a respective one of the attachments. A press is arranged against the rotor. The press axially engages each of the rotor blades. The press moves axially along the axis to simultaneously push the rotor blades and remove the attachments from a plurality of slots in the rotor disk.

18 Claims, 12 Drawing Sheets

SIMULTANEOUSLY DISASSEMBLING ROTOR BLADES FROM A GAS TURBINE ENGINE ROTOR DISK

TECHNICAL FIELD

This disclosure relates generally to a gas turbine engine and, more particularly, to methods and tools for disassembling a bladed rotor of the gas turbine engine.

BACKGROUND INFORMATION

A gas turbine engine includes multiple bladed rotors such as, but not limited to, a fan rotor, a compressor rotor and a turbine rotor. Each bladed rotor may include a rotor disk and a plurality of rotor blades mechanically attached to the rotor disk. The bladed rotor may also include feather seals for sealing inter-platform gaps between circumferentially neighboring rotor blades. Various methods and tools are known in the art for disassembling a bladed rotor. While these known disassembly methods and tools have various advantages, there is still room in the art for improvement.

SUMMARY

According to an aspect of the present disclosure, a method is provided for disassembling a rotor of a gas turbine engine. During this method, the rotor is provided which includes a rotor disk and a plurality of rotor blades arranged circumferentially about an axis. The rotor blades include a plurality of airfoils and a plurality of attachments that mount the rotor blades to the rotor disk. Each of the rotor blades includes a respective one of the airfoils and a respective one of the attachments. A press is arranged against the rotor. The press axially engages each of the rotor blades. The press moves axially along the axis to simultaneously push the rotor blades and remove the attachments from a plurality of slots in the rotor disk.

According to another aspect of the present disclosure, another method is provided for disassembling a rotor of a gas turbine engine. During this method, the rotor is provided which includes a rotor disk and a plurality of rotor blades arranged circumferentially about an axis. The rotor blades include a plurality of airfoils and a plurality of attachments that mount the rotor blades to the rotor disk. Each of the rotor blades includes a respective one of the airfoils and a respective one of the attachments. The rotor blades are supported on top of a blade support structure. The blade support structure axially engages each of the rotor blades. The attachments are removed from a plurality of slots in the rotor disk. The removing of the attachments includes simultaneously axially pushing the rotor blades against the blade support structure.

According to still another aspect of the present disclosure, a fixture is provided for disassembling a rotor of a gas turbine engine. This disassembly fixture includes a disk support structure, a blade support structure and a press. The disk support structure includes a first member and a second member. The disk support structure is configured to support a rotor disk of the rotor axially between the first member and the second member during disassembly of the rotor. The blade support structure is configured to support a plurality of rotor blades of the rotor during the disassembling of the rotor. The blade support structure circumscribes and is slidable against an outer periphery of the first member. The blade support structure extends axially along an axis of the rotor to a planar annular blade support structure surface configured to axially locate and engage the rotor blades. The press is configured to push the rotor blades against the blade support structure to simultaneously remove attachments of the rotor blades from slots in the rotor disk. The press circumscribes and is slidable against an outer periphery of the second member. The press extends axially along the axis to a planar annular press surface configured to engage the rotor blades.

The press may include an actuator member. The actuator member may be attached to the disk support structure by a threaded post. A connection between the actuator member and the threaded post may be configured to translate rotational movement of the actuator member about the axis into axial movement of the actuator member along the axis.

The disassembly fixture may also include a guide connected to the disk support structure and projecting radially into a slot in a sleeve of the press. At least a portion of the slot may extend longitudinally within the sleeve axially along the axis and circumferentially about the axis.

The blade support structure may be movably attached to the first member by a seal ring.

The rotor blades may also include a plurality of platforms. Each of the rotor blades may also include a respective one of the platforms. Axial edges of the platforms may define a reference plane while the attachments are removed from the slots.

The rotor may also include a plurality of seal elements. Each of the seal elements may be disposed within a respective cavity formed by and between a respective circumferentially neighboring pair of the rotor blades.

The method may also include removing each of the seal elements from the respective cavity subsequent to the removal of the attachments from the slots.

The seal elements may include a first seal element. The first seal element may include a base and a plurality of tabs connected to and projecting out from the base.

Each of the tabs may project radially inward from the base to a distal tab end.

The rotor disk may also include a plurality of lugs. Each of the slots may be formed by and between a respective circumferentially neighboring pair of the lugs. A first of the lugs may project radially outward to a distal lug end. This distal lug end may include a first end surface and a second end surface recessed radially inward from the first end surface. A first of the tabs may be operable to radially engage the first end surface and a second of the tabs may be operable to radially engage the second end surface.

The press may be disposed on top of the rotor. The press may move axially downward along the axis to simultaneously push the rotor blades and remove the attachments from the slots.

The rotor blades may also include a plurality of platforms. Each of the rotor blades may also include a respective one of the platforms. A planar annular surface of the press may be abutted axially against axial edges of the platforms.

The method may also include rotating a member of the press circumferentially about the axis as the press moves axially along the axis.

The method may also include supporting the rotor blades on top of a blade support structure as the press simultaneously pushes the rotor blades. The blade support structure may axially engage each of the rotor blades. The rotor blades may be axially between the blade support structure and the press.

A planar annular surface of the blade support structure may be abutted axially against axial sides of the attachments.

The method may also include arranging the rotor with a disk support structure. The blade support structure may be slidable along and circumscribe the disk support structure.

The method may also include arranging the rotor with a disk support structure. The press may be slidable along and circumscribe the disk support structure.

The rotor disk may be configured as or otherwise include a turbine disk of the gas turbine engine. The rotor blades may be configured as or otherwise include a plurality of turbine blades of the gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
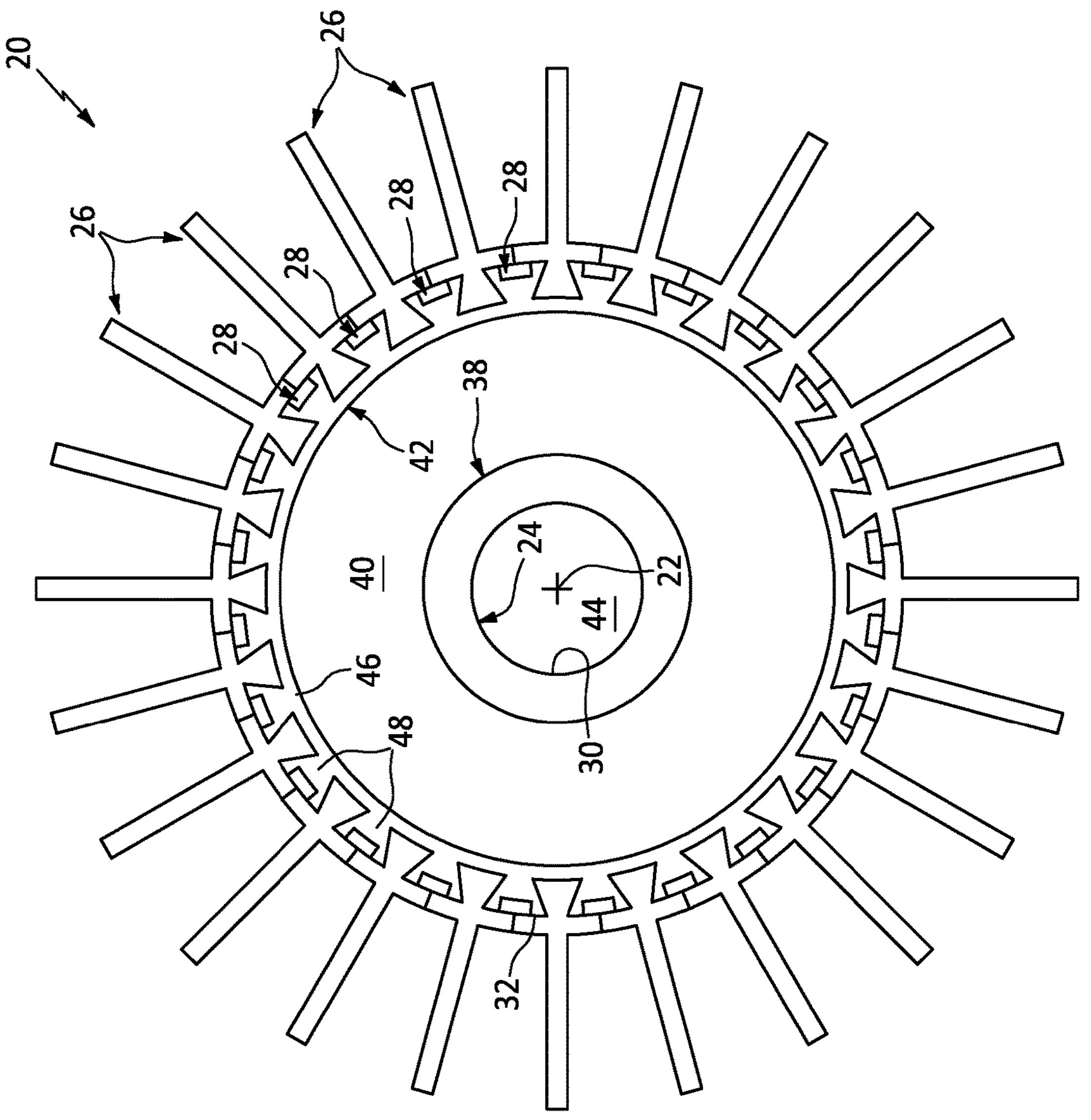
FIG. 1 is a schematic illustration of a bladed rotor for a gas turbine engine.

FIG. 1 schematically illustrates a bladed rotor 20 for a gas turbine engine. This bladed rotor 20 is rotatable about a rotational axis 22, which rotational axis 22 is also an axial centerline of the bladed rotor 20. The bladed rotor 20 of FIG. 1 includes a rotor disk 24 and a plurality of rotor blades 26 attached to and arranged circumferentially around the rotor disk 24 in a circular array. The bladed rotor 20 of FIG. 1 also includes a plurality of seal elements 28; e.g., feather seals.

Figure 2:
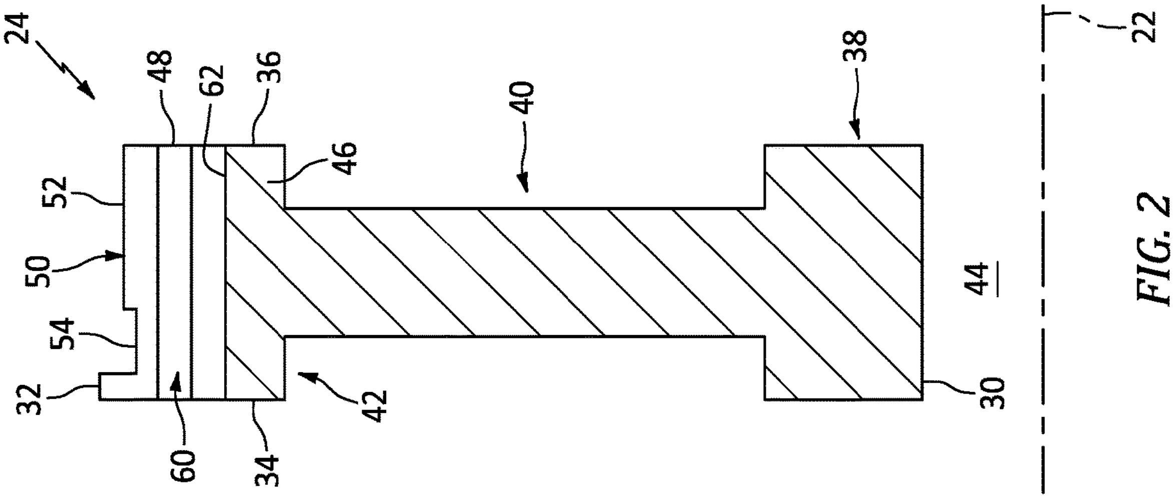
FIG. 2 is a partial side sectional schematic illustration of a rotor disk.

Referring to FIG. 2, the rotor disk 24 extends radially between and to a radial inner side 30 of the rotor disk 24 and a radial outer side 32 of the rotor disk 24. The rotor disk 24 extends axially along the axis 22 between and to an axial first (e.g., upstream) side 34 of the rotor disk 24 and an axial second (e.g., downstream) side 36 of the rotor disk 24. Referring to FIG. 1, the rotor disk 24 extends circumferentially around the axis 22 providing the rotor disk 24 with an annular body. The rotor disk 24 includes a disk hub 38, a disk web 40 and a disk rim 42.

The disk hub 38 is disposed at the disk inner side 30. The disk hub 38 forms a bore 44 through the rotor disk 24 along the axis 22 between the disk first side 34 and the disk second side 36; see also FIG. 2.

The disk web 40 is disposed radially between and connected to (e.g., formed integral with) the disk hub 38 and the disk rim 42. The disk web 40 of FIG. 1 extends radially out from the disk hub 38 to the disk rim 42.

Figure 3:
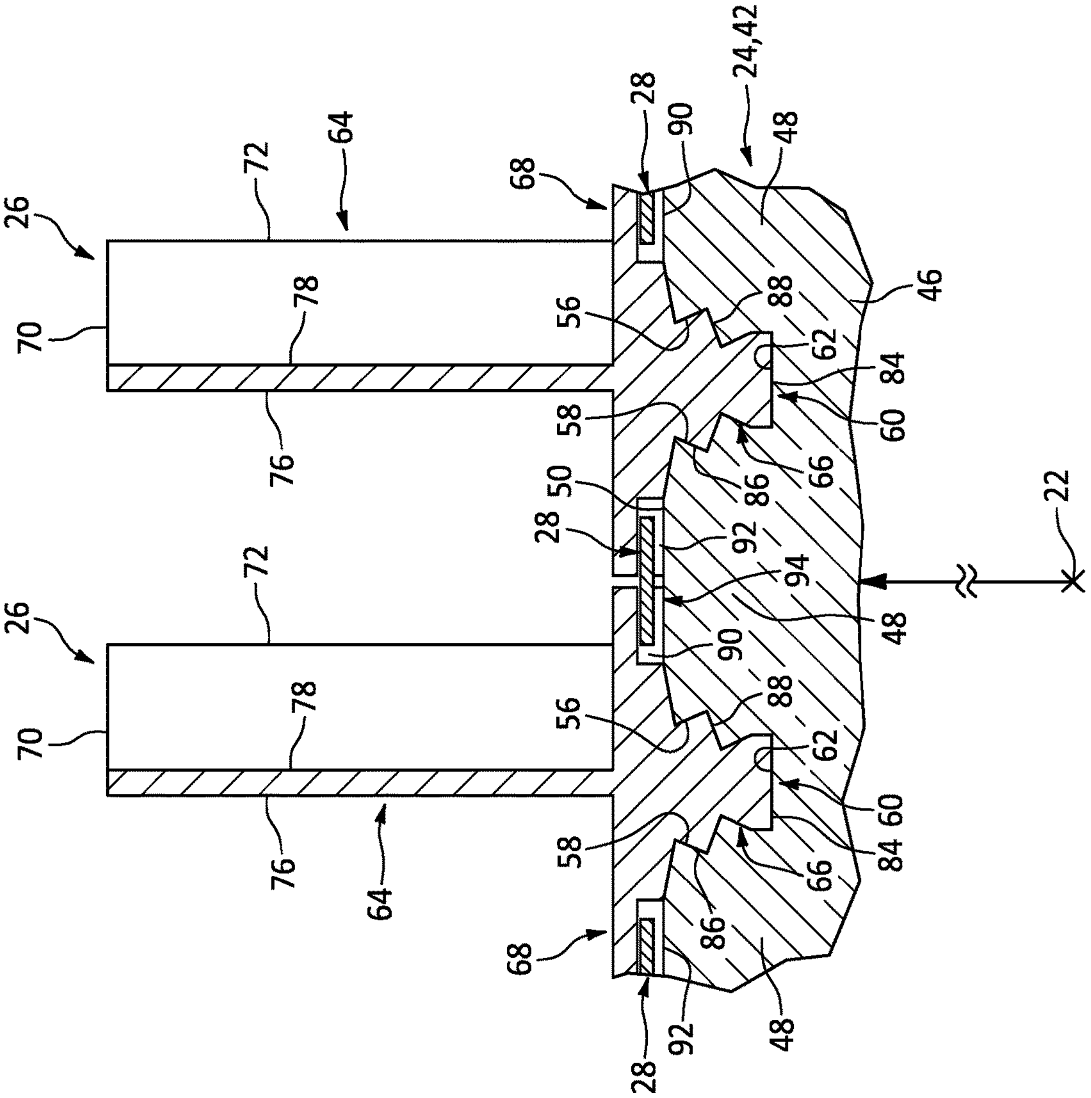
FIG. 3 is a partial cross-sectional schematic illustration of the bladed rotor.

The disk rim 42 is disposed at the disk outer side 32. The disk rim 42 forms a radial outer periphery of the rotor disk 24. The disk rim 42 includes an annular rim base 46 and a plurality of rotor disk lugs 48 connected to (e.g., formed integral with) the rim base 46. The disk lugs 48 are arranged circumferentially about the axis 22 in a circular array. Referring to FIG. 2, each of the disk lugs 48 projects radially out from the rim base 46 to a radial outer distal lug end 50 of the respective disk lug 48. This distal lug end 50 may have a stepped geometry. The distal lug end 50 of FIG. 2, for example, includes a first end surface 52 and a second end surface 54 recessed radially inward from the first end surface 52. Each of the disk lugs 48 extends axially along the axis 22 between and to the disk first side 34 and the disk second side 36. Referring to FIG. 3, each of the disk lugs 48 extends circumferentially about the axis 22 between and to a circumferential first side 56 of the respective disk lug 48 and a circumferential second side 58 of the respective disk lug 48.

The disk lugs 48 are configured to provide the rotor disk 24 with a plurality of retaining slots 60. Each of the retaining slots 60 is formed by and extends circumferentially between a respective circumferentially neighboring (e.g., adjacent) pair of the disk lugs 48. Each retaining slot 60 of FIG. 3, for example, extends circumferentially within the rotor disk 24 and its disk rim 42 between and to the lug first side 56 of a first of the circumferentially neighboring pair of the disk lugs 48 and the lug second side 58 of a second of the circumferentially neighboring pair of the disk lugs 48. Referring to FIG. 2, each retaining slot 60 projects radially into the rotor disk 24 and its disk rim 42 from the disk outer side 32 to a bottom 62 of the respective retaining slot 60. Each of the retaining slots 60 may extend axially through the rotor disk 24 and its disk rim 42 along the axis 22 between and to the disk first side 34 and the disk second side 36. Examples of the retaining slots 60 include, but are not limited to, a firtree slot and a dovetail slot.

Figure 4:
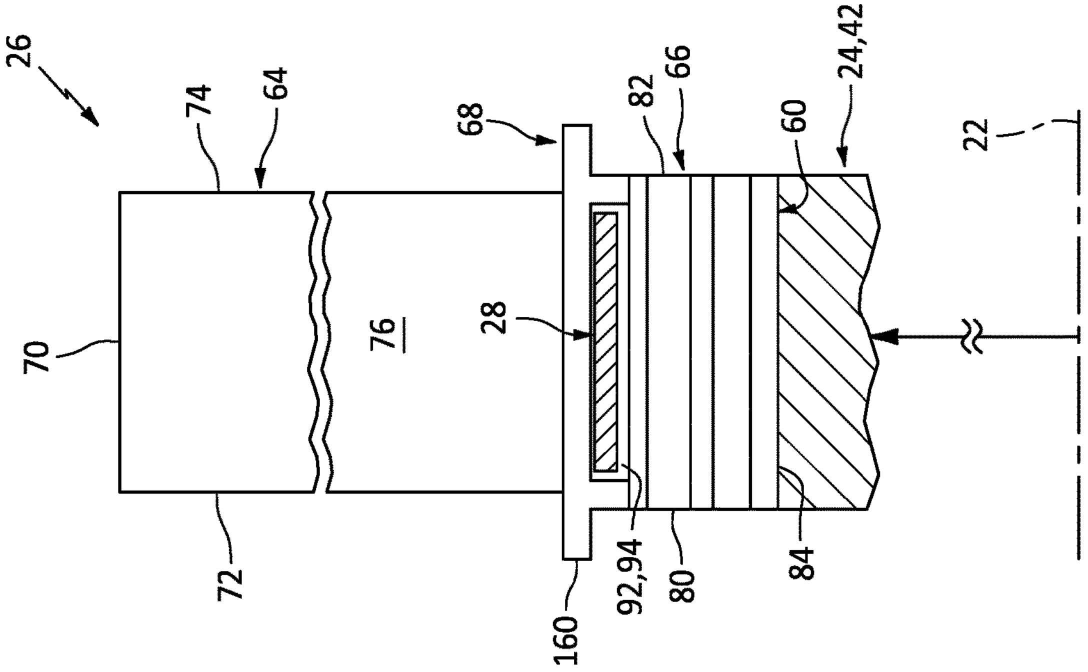
FIG. 4 is a partial side sectional schematic illustration of the bladed rotor.

Referring to FIG. 4, each of the rotor blades 26 includes a blade airfoil 64 and a blade attachment 66; e.g., a blade root. Each of the rotor blades 26 may also include a blade platform 68 radially between and connected to (e.g., formed integral with) the blade airfoil 64 and the blade attachment 66.

The blade airfoil 64 projects spanwise along a span line (e.g., radially away from the axis 22) from the blade platform 68 to a (e.g., unshrouded) tip 70 of the blade airfoil 64. The blade airfoil 64 extends chordwise along a chord line (e.g., generally axially along the axis 22) between and to a leading edge 72 of the blade airfoil 64 and a trailing edge 74 of the blade airfoil 64. Referring to FIG. 3, the blade airfoil 64 extends laterally between and to a first (e.g., concave, pressure) side 76 of the blade airfoil 64 and a second (e.g., convex, suction) side 78 of the blade airfoil 64. Referring to FIGS. 3 and 4, the airfoil first side 76 and the airfoil second side 78 each extend chordwise to and meet at the airfoil leading edge 72 and the airfoil trailing edge 74. The airfoil first side 76 and the airfoil second side 78 also extend spanwise from the blade platform 68 to and may meet at the airfoil tip 70.

The blade attachment 66 of FIG. 4 extends axially along the axis 22 between and to an axial first (e.g., upstream) end 80 of the blade attachment 66 and an axial second (e.g., downstream) end 82 of the blade attachment 66. The blade attachment 66 projects radially inward towards the axis 22 from the blade platform 68 to a radial inner distal attachment end 84 of the blade attachment 66. Referring to FIG. 3, the blade attachment 66 extends circumferentially between and to a circumferential first side 86 of the blade attachment 66 and a circumferential second side 88 of the blade attachment 66. The attachment first side 86 and the attachment second side 88 are contoured to mate with contours of a respective one of the retaining slots 60. The blade attachment 66, for example, may be configured as a blade root such as, but not limited to, a firtree root or a dovetail root. With such a configuration, each blade attachment 66 and its blade root may be seated within the respective retaining slot 60 to mount the respective rotor blade 26 to the rotor disk 24. It should be noted however, while the blade attachment 66 may consist of (e.g., only include) the blade root, it is contemplated the blade attachment 66 may also include a neck between the blade root and the blade platform 68 in other embodiments.

Referring to FIG. 3, the blade attachment 66 includes one or more pockets 90 and 92. The first pocket 90 is disposed on the attachment second side 88. The second pocket 92 is disposed on the attachment first side 86. Each of these pockets 90 and 92 projects circumferentially into the blade attachment 66 from the respective attachment side 88, 86 to a distal pocket end. Each of the pockets 90 and 92 extends radially into the rotor blade 26 to a radial outer pocket side; e.g., formed by a radial inner side of the blade platform 68. Referring to FIG. 4, each of the pockets 90 and 92 extends axially within the blade attachment 66 between and to an axial first pocket end and an axial second pocket end.

Figure 5B:
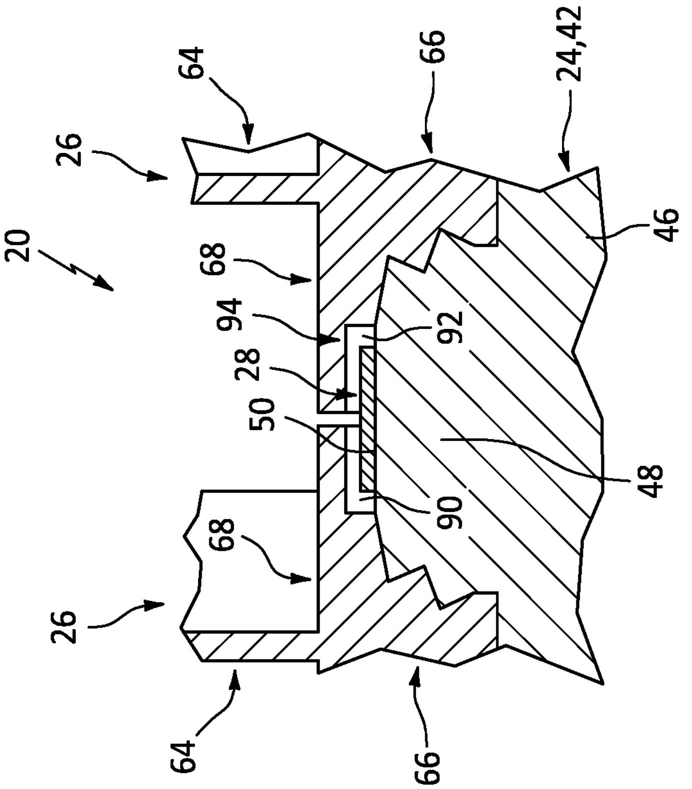
FIG. 5B is a partial side sectional schematic illustration of the bladed rotor with a seal element at a nonoperational position.
Figure 5A:
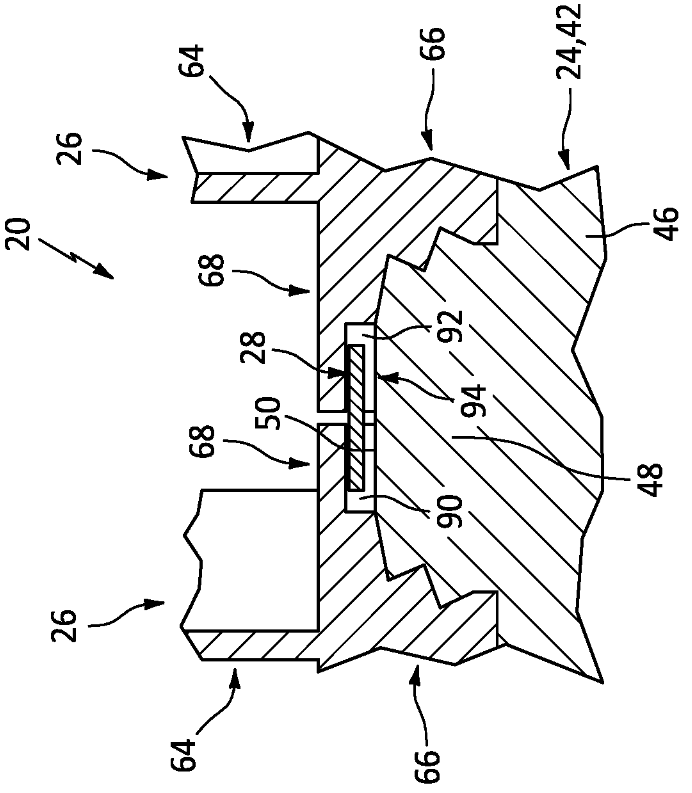
FIG. 5A is a partial side sectional schematic illustration of the bladed rotor with a seal element at an operational position.

Referring to FIGS. 3 and 4, each of the seal elements 28 is disposed in a seal element cavity 94 formed by and circumferentially between a respective circumferentially neighboring pair of the rotor blades 26. This cavity 94 may include the first pocket 90 in a first of the circumferentially neighboring pair of the rotor blades 26 and the second pocket 92 in a second of the circumferentially neighboring pair of the rotor blades 26. Referring to FIG. 5A, during gas turbine engine operation and/or while the rotor disk 24 is rotating about its axis 22, each seal element 28 may be forced radially outward and radially engage (e.g., contact) undersides of the respective blade platforms 68. Each seal element 28 may thereby seal a circumferential gap between a respective circumferentially neighboring pair of the blade platforms 68. However, referring to FIG. 5B, each seal element 28 may rest against the distal lug end 50 of a respective disk lug 48 when the gas turbine engine is nonoperational and/or while the rotor disk 24 is stationary.

Figure 6:
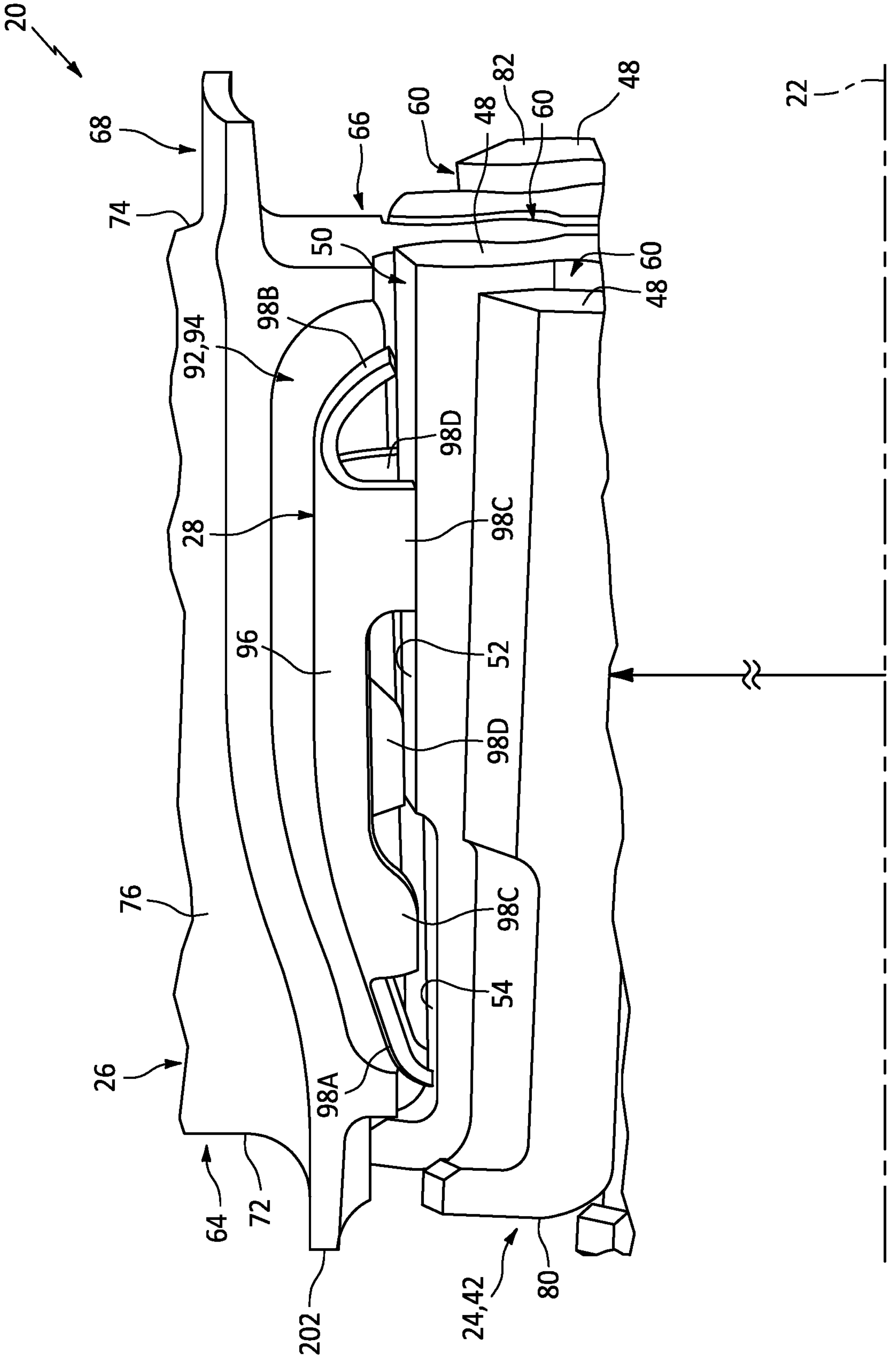
FIG. 6 is a partial perspective illustration of the bladed rotor, where the bladed rotor is shown with a single rotor blade and a single seal element for ease of illustration.

Referring to FIG. 6, each of the seal elements 28 may include an element base 96 and one or more element tabs 98 (e.g., 98A-D). Each of the element tabs 98 is connected to (e.g., formed integral with) the element base 96. Each of the element tabs 98 projects (e.g., radially inward towards the axis 22) out from the element base 96 to a distal tab end of the respective element tab 98. The first end tab 98A may be arranged at an axial first (e.g., upstream) end of the respective seal element 28. The second end tab 98B may be arranged at an axial second (e.g., downstream) end of the respective seal element 28 that is axially opposite the element first end. The first side tab(s) 98C are arranged along a circumferential first side of the respective seal element 28. The second side tab(s) 98D are arranged along a circumferential second side of the respective seal element 28. The element tabs 98 may thereby provide each seal element 28 with a bumpy, undulating radial inner geometry. Furthermore, while the rotor disk 24 is stationary, one or more of the element tabs 98 (e.g., 98B, 98C, 98D) may radially engage (e.g., contact) the respective first end surface 52 and one or more of the element tabs 98 (e.g., 98A, 98C, 98D) may radially engage the respective second end surface 54. With such a configuration, it may be difficult to remove the seal elements 28 from the cavities 94 during bladed rotor disassembly, particularly where the seal element 28 and any one or more of its element tabs 98 slide along the distal lug ends 50 and its end surfaces 52 and 54.

Figure 7:
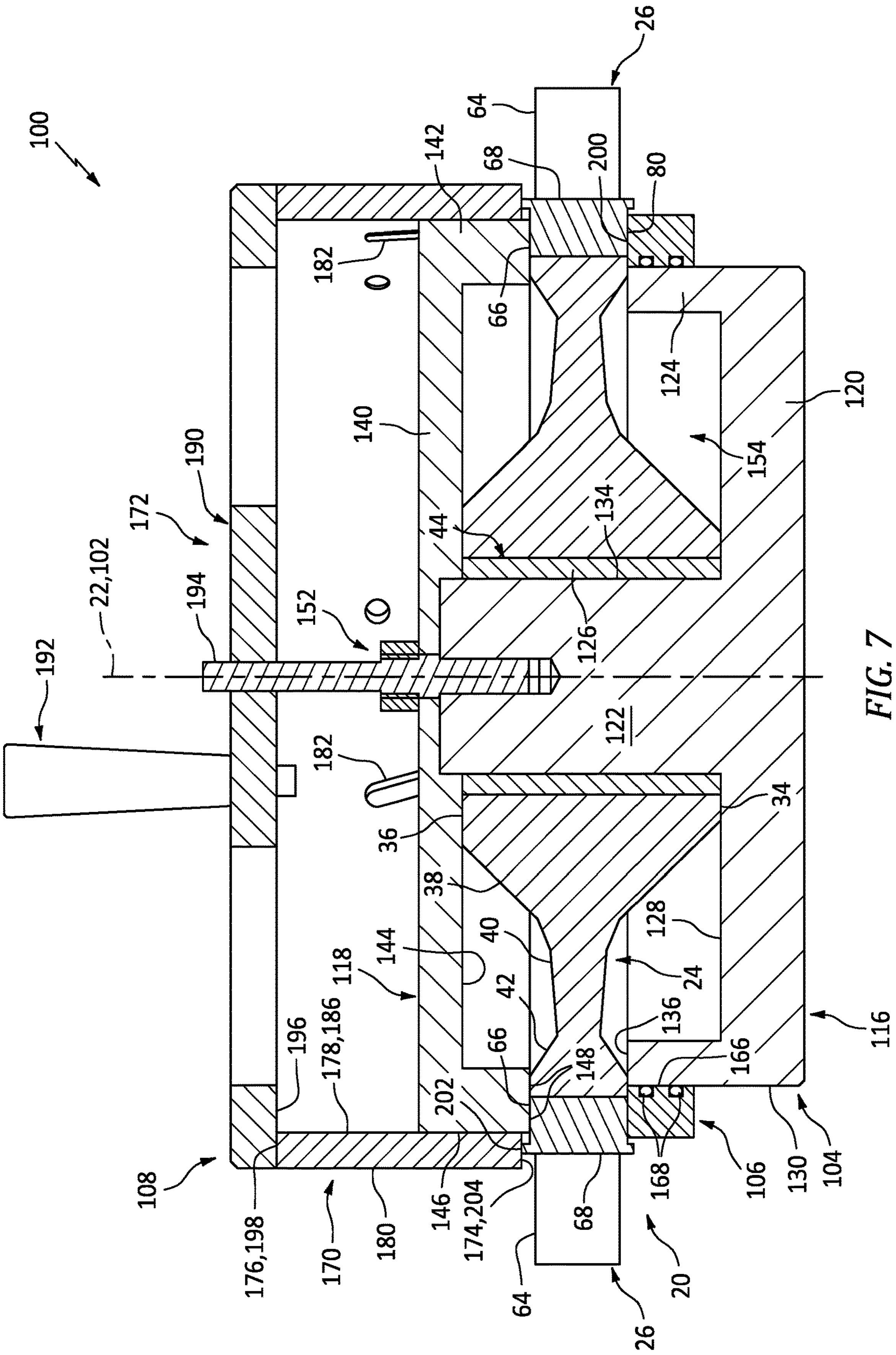
FIG. 7 is a side sectional illustration of a fixture for disassembling a bladed rotor.

FIG. 7 illustrates a fixture 100 for use in disassembling a bladed rotor such as, but not limited to, the bladed rotor 20. This disassembly fixture 100 has a centerline axis 102, which centerline axis 102 may be coaxial with the rotational axis 22 during disassembly of the bladed rotor 20. The centerline axis 102 of FIG. 7 is arranged vertically with respect to gravity for disassembly of the bladed rotor 20 such that the centerline axis 102 is perpendicular to a horizon line. The disassembly fixture 100 of FIG. 7 includes a stationary disk support structure 104, a movable blade support structure 106 and a rotor blade press 108.

Figure 8:
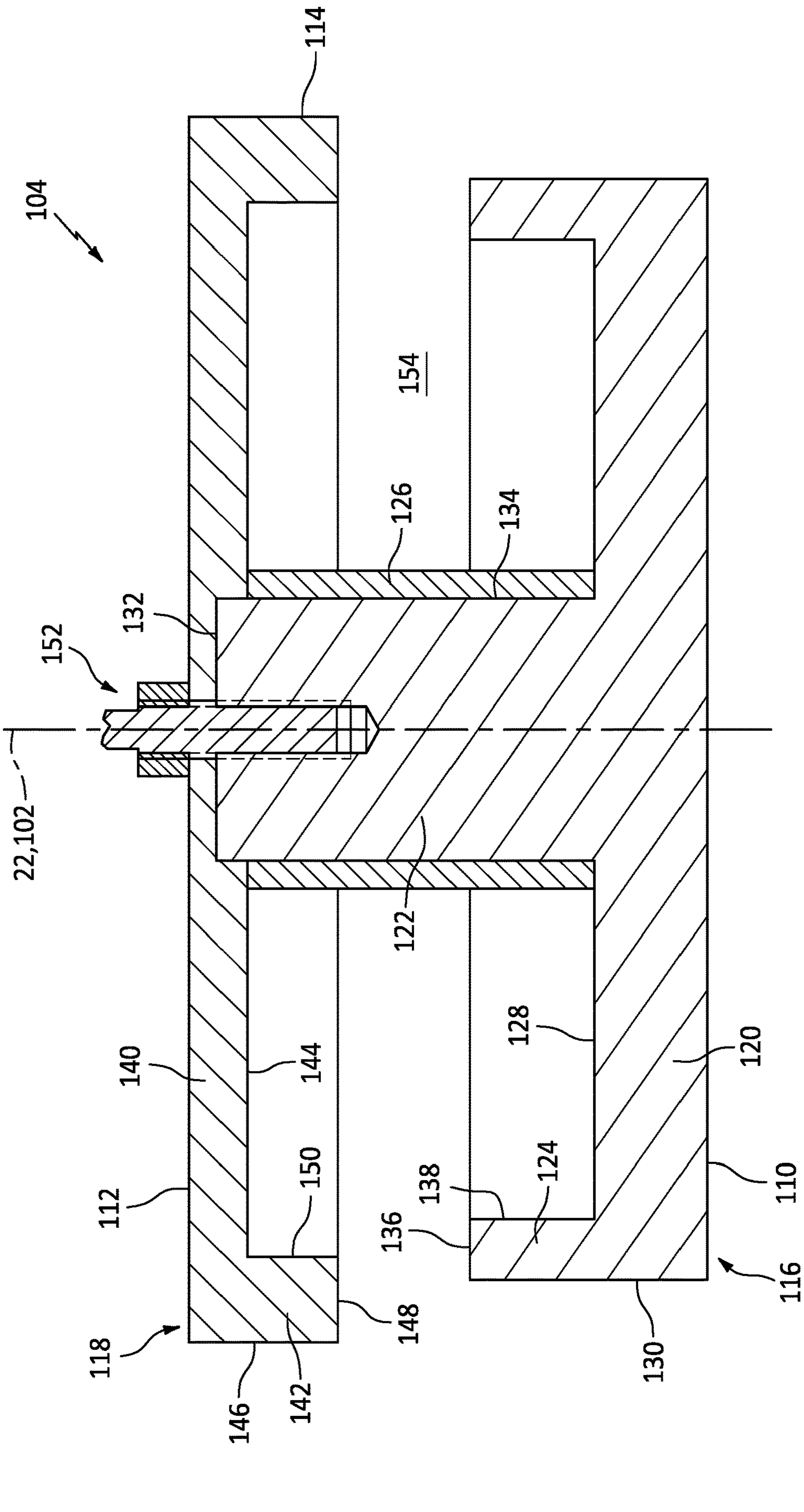
FIG. 8 is a side sectional illustration of a rotor disk support structure.

Referring to FIG. 8, the disk support structure 104 extends axially along the axis 22, 102 between and to an axial bottom side 110 of the disk support structure 104 and an axial top side 112 of the disk support structure 104. The disk support structure 104 extends radially out from the axis 22, 102 to a radial outer side 114 of the disk support structure 104. The disk support structure 104 extends circumferentially around the axis 22, 102 providing the disk support structure 104 with a full-hoop body. The disk support structure 104 of FIG. 8 includes a bottom (e.g., base) member 116 and a top (e.g., cap) member 118.

The bottom member 116 includes a bottom member base 120, a bottom member radial locator 122 and a bottom member axial locator 124. The bottom member 116 may also include a (e.g., removable) bottom member bushing 126 (e.g., a spacer, an adaptor, etc.) mounted on the bottom member radial locator 122.

The bottom member base 120 is disposed at the structure bottom side 110. The bottom member base 120, for example, extends axially along the axis 22, 102 from the structure bottom side 110 to a planar, annular top surface 128 of the bottom member base 120. The bottom member base 120 projects radially out from the axis 22, 102 to a cylindrical outer surface 130 of the bottom member 116 at (or towards) the structure outer side 114.

The bottom member radial locator 122 is connected to (e.g., formed integral with) the bottom member base 120 and disposed at a top side 132 of the bottom member 116. The bottom member radial locator 122, for example, projects axially along the axis 22, 102 out from the bottom member base 120 to the bottom member top side 132. The bottom member radial locator 122 projects radially out from the axis 22, 102 to a cylindrical outer surface 134 of the bottom member radial locator 122, which surface 134 is covered by the bushing 126 in FIG. 8. The radial locator outer surface 134 extends axially from the bottom member base top surface 128 to the bottom member top side 132.

The bottom member axial locator 124 is connected to (e.g., formed integral with) the bottom member base 120 and disposed at (or towards) the bottom member top side 132. The bottom member axial locator 124, for example, projects axially along the axis 22, 102 out from the bottom member base 120 to an annular, planar top surface 136 of the bottom member axial locator 124. The axial locator top surface 136 may be axially recessed inward from the bottom member top side 132 by an axial distance such that an axial height of the bottom member radial locator 122 is greater than an axial height of the bottom member axial locator 124; however, the present disclosure is not limited to such an exemplary dimensional relationship. The bottom member axial locator 124 extends radially between and to a cylindrical inner surface 138 of the bottom member axial locator 124 and the bottom member outer surface 130. The axial locator inner surface 138 extends axially from the bottom member base top surface 128 to the axial locator top surface 136. The axial locator top surface 136 extends radially between and to the axial locator inner surface 138 and the bottom member outer surface 130.

The top member 118 includes a top member base 140 and a top member axial locator 142. The top member base 140 is disposed at the structure top side 112. The top member base 140, for example, extends axially along the axis 22, 102 from the structure top side 112 to a planar, annular bottom surface 144 of the top member base 140. The top member base 140 projects radially out from the axis 22, 102 to a cylindrical outer surface 146 of the top member 118 at the structure outer side 114. Here, the top member outer surface 146 is spaced radially outward from the bottom member outer surface 130.

The top member axial locator 142 is connected to (e.g., formed integral with) the top member base 140 and disposed at (or towards) a bottom side of the top member 118. The top member axial locator 142, for example, projects axially along the axis 22, 102 out from the top member base 140 to an annular, planar bottom surface 148 of the top member axial locator 142. The top member axial locator 142 extends radially between and to a cylindrical inner surface 150 of the top member axial locator 142 and the top member outer surface 146. The axial locator inner surface 150 extends axially from the top member base bottom surface 144 to the axial locator bottom surface 148. The axial locator bottom surface 148 extends radially between and to the axial locator inner surface 150 and the top member outer surface 146.

The top member 118 is mated to the bottom member 116. A distal end portion of the bottom member radial locator 122, for example, may project axially into a recess in the top member base 140. The top member 118 may be mechanically fastened to the bottom member 116. At least one fastener 152 (e.g., threaded stud), for example, may removably secure the top member 118 and its top member base 140 to the bottom member 116 and its bottom member radial locator 122. With this arrangement, the blade support structure 106 is provided with an annular rotor receptacle 154 axially between the bottom member 116 and the top member 118.

Figure 9:
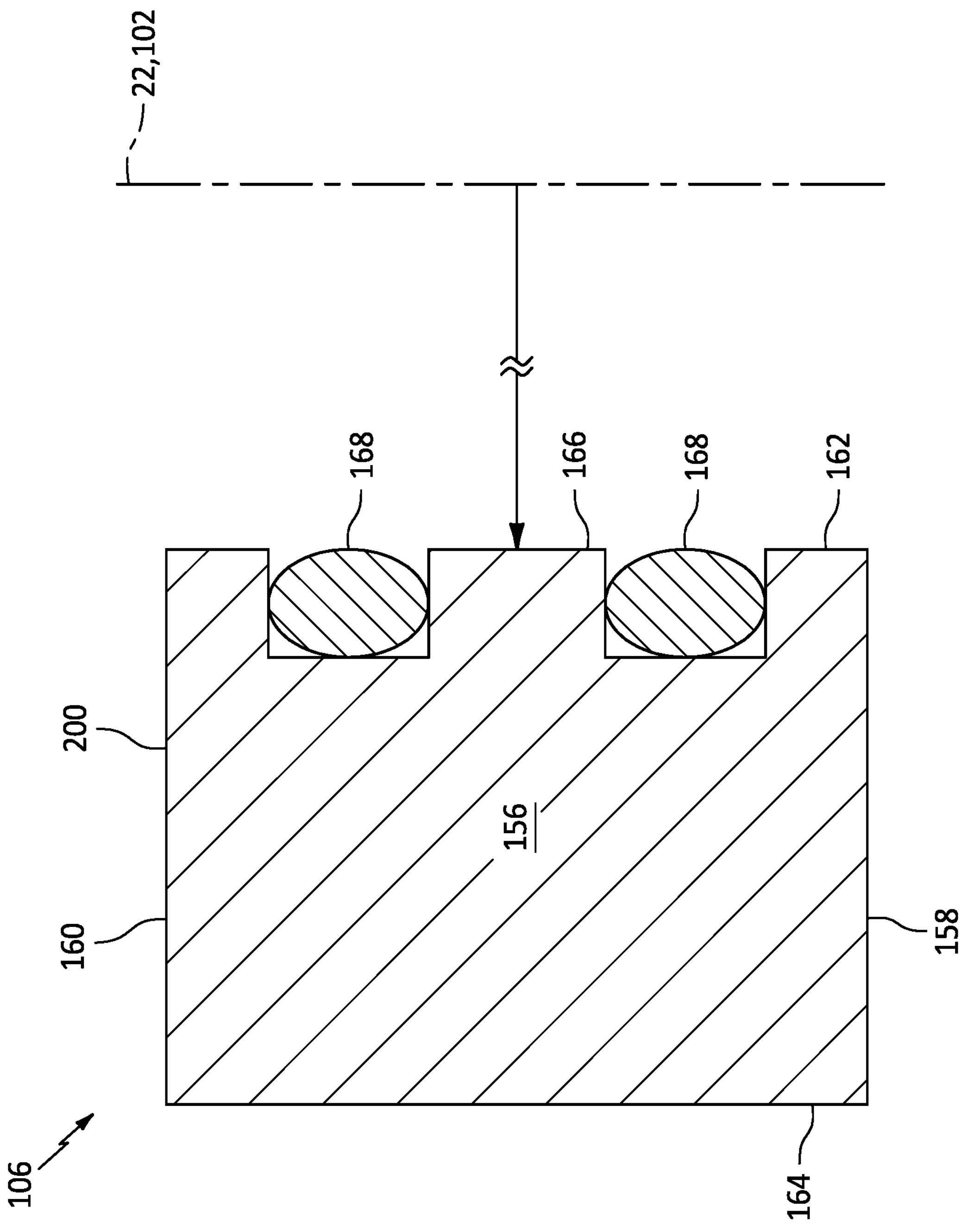
FIG. 9 is a partial side sectional illustration of a rotor blade support structure.

Referring to FIG. 9, the blade support structure 106 may be configured as or otherwise includes a tubular sleeve 156. The blade support structure 106 and its structure sleeve 156 extend axially along the axis 22, 102 between and to an axial bottom side 158 of the blade support structure 106 and an axial top side 160 of the blade support structure 106. The blade support structure 106 and its structure sleeve 156 extend radially between and to a radial inner side 162 of the blade support structure 106 and a radial outer side 164 of the blade support structure 106. The blade support structure 106 and its structure sleeve 156 extend circumferentially around the axis 22, 102 providing the blade support structure 106 and its structure sleeve 156 with a tubular body.

Referring to FIG. 7, the blade support structure 106 is mated with the disk support structure 104. The disk support structure 104 and its bottom member 116, for example, are inserted axially into a bore of the blade support structure 106. A cylindrical inner surface 166 of the blade support structure 106 radially engages and is moveable against (e.g., slidable along) the bottom member outer surface 130. To maintain an axial position of the blade support structure 106 along the bottom member 116 (e.g., under a force of gravity), the blade support structure 106 may be movably attached to the bottom member 116 through one or more seal rings 168; e.g., a polymer O-ring. These seal rings 168 may provide a slight interference fit between the blade support structure 106 and the bottom member 116 such that, for example, the blade support structure 106 does not freely slide axially along the bottom member 116 without being subject to an outside force greater than a combined weight of the blade support structure 106 and the rotor blades 26.

The blade press 108 includes a press sleeve 170 and a press actuator 172. The press sleeve 170 extends axially along the axis 22, 102 between and to an axial bottom side 174 of the press sleeve 170 and an axial top side 176 of the press sleeve 170. The press sleeve 170 extends radially between and to a radial inner side 178 of the press sleeve 170 and a radial outer side 180 of the press sleeve 170. The press sleeve 170 extends circumferentially around the axis 22, 102 providing the press sleeve 170 with a tubular body.

Figure 10:
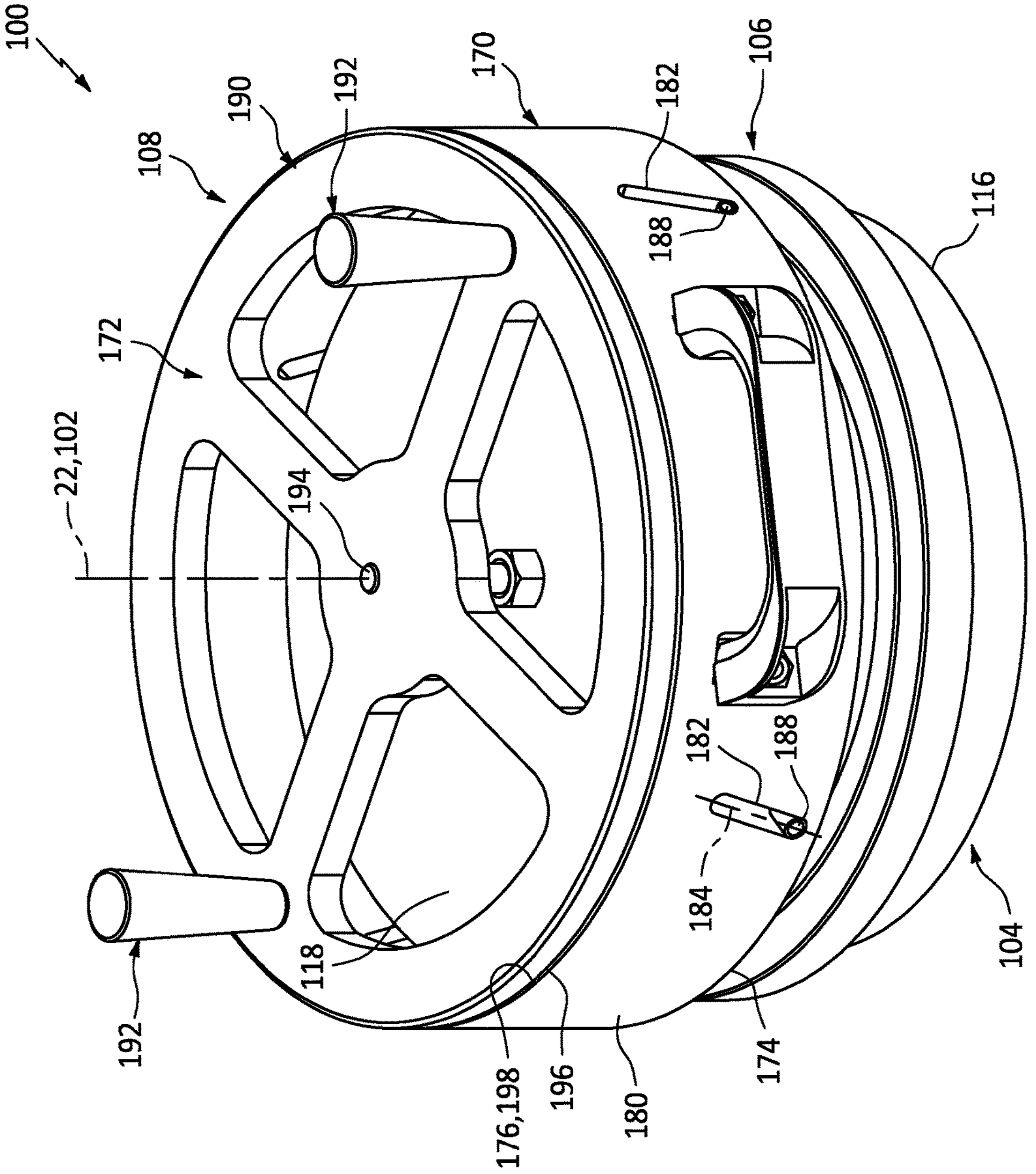
FIG. 10 is a perspective illustration of the disassembly fixture.

The press sleeve 170 includes one or more slots 182 (e.g., guide tracks) arranged circumferentially about the axis 22, 102. Referring to FIG. 10, each of the slots 182 extends radially through the press sleeve 170 between the sleeve inner side 178 (see FIG. 7) and the sleeve outer side 180. Each of the slots 182 of FIG. 10 extends longitudinally within the press sleeve 170 along a longitudinal trajectory 184 (e.g., centerline) of the respective slot 182. At least a portion or an entirety of this longitudinal trajectory 184 may (e.g., only) include an axial component and a circumferential component, where the axial component is greater than the circumferential component.

Referring to FIG. 7, the press sleeve 170 is mated with the disk support structure 104. The disk support structure 104 and its top member 118, for example, are inserted axially into a bore of the press sleeve 170. A cylindrical inner surface 186 of the press sleeve 170 radially engages (e.g., contacts) and is moveable against (e.g., slidable along) the top member outer surface 146. Referring to FIG. 10, each of the slots 182 receives a respective guide 188; e.g., a post, a fastener, a pin, etc. This guide 188 is attached to the disk support structure 104 and its top member 118. The guide 188 projects radially out from the disk support structure 104 and its top member 118 into the respective slot 182.

Referring to FIG. 7, the press actuator 172 includes an actuator member 190 and one or more handles 192. The actuator member 190 may be configured as or otherwise include a rotor such as a wheel. This actuator member 190 is mated with (e.g., threaded onto) a threaded post 194 of the fastener 152. An axial bottom surface 196 of the actuator member 190 at a radial outer periphery of the actuator member 190 axially engages (e.g., contacts) an axial top surface 198 of the press sleeve 170 at the sleeve top end 176. With this arrangement, a threaded connection between the actuator member 190 and the threaded post 194 may translate rotational movement of the press actuator 172 and its actuator member 190 about the axis 22, 102 into axial movement along the axis 22, 102. Thus, the actuator member 190 moves axially downwards along the axis 22, 102 as the actuator member 190 is threaded further onto the threaded post 194. As the press actuator 172 and its actuator member 190 move axially in a downward direction, the actuator member 190 may push axially against and thereby axially move the press sleeve 170. The handles 192 are attached to the actuator member 190 to facilitate the rotation of the actuator member 190 about the axis 22, 102. However, in other embodiments, the handles 192 may be omitted and the actuator member 190 may be otherwise rotated about the axis 22, 102.

Figure 11:
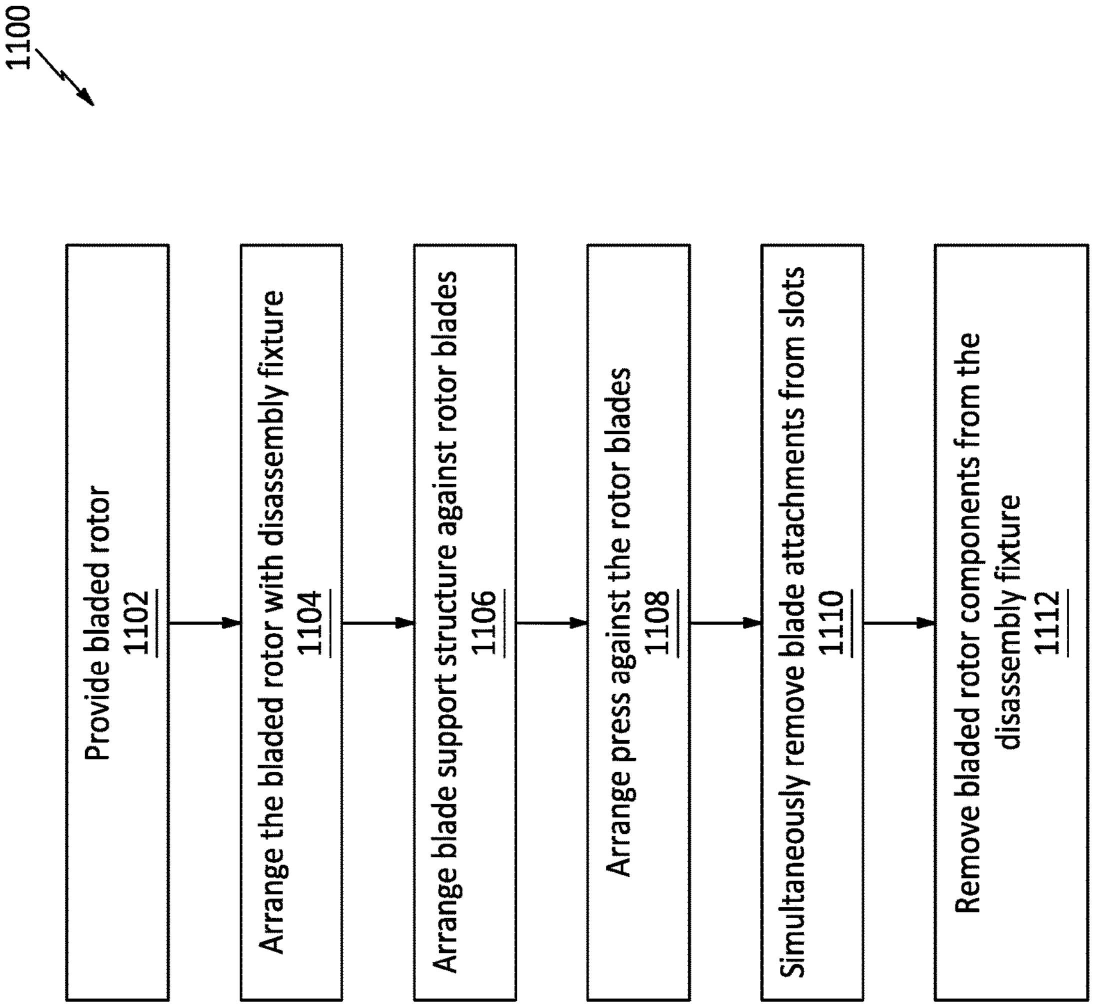
FIG. 11 is a flow diagram of a method for disassembling a bladed rotor.

FIG. 11 is a flow diagram of a method 1100 for disassembling a bladed rotor using a disassembly fixture. For ease of description, the disassembly method 1100 of FIG. 11 is described with respect to the bladed rotor 20 and the disassembly fixture 100. The disassembly method 1100 of the present disclosure, however, is not limited to disassembling such an exemplary bladed rotor and/or using such an exemplary disassembly fixture.

In step 1102, the bladed rotor 20 is provided.

In step 1104, the bladed rotor 20 is arranged with the disassembly fixture 100. The bladed rotor 20 of FIG. 7, for example, may be disposed on top of/mated with the bottom member 116 before the top member 118 is mated with the bottom member 116. The bladed rotor 20 and, more particularly, the rotor disk 24 may be captured/secured (e.g., clamped) within the receptacle 154 axially between the bottom member 116 and the top member 118. In this position, the bottom member radial locator 122 may project axially into the disk bore 44. The radial locator outer surface 134 may radially engage the disk hub 38 (e.g., directly/contact, or indirectly through the bushing 126). The bottom member radial locator 122 may thereby radially locate the rotor disk 24 with the disk support structure 104. The disk hub 38 may axially engage (e.g., contact) the bottom member base top surface 128, and the disk rim 42 may axially engage (e.g., contact) the axial locator top surface 136. The top surface(s) 128 and/or 136 may thereby axially locate the rotor disk 24 with the disk support structure 104. The disk hub 38 may also axially engage (e.g., contact) the top member base bottom surface 144, and/or the disk rim 42 may axially engage (e.g., contact) the axial locator bottom surface 148.

In step 1106, the blade support structure 106 is arranged against the bladed rotor 20 and its rotor blades 26. The blade support structure 106, for example, may axially slide along the bottom member 116 until the attachment first ends 80 axially engage (e.g., contact, lay flat against, rest against, etc.) a planar annular top surface 200 of the blade support structure 106 at its top side 160 (see FIG. 9).

In step 1108, the blade press 108 is arranged against the bladed rotor 20 and its rotor blades 26. The press sleeve 170, for example, may be rested on top of the rotor blades 26 such that axial (e.g., trailing) edges 202 of the platforms 68 axially engage (e.g., contact, lay flat against, etc.) a planar annular bottom surface 204 of the press sleeve 170 at its bottom side.

Figure 12:
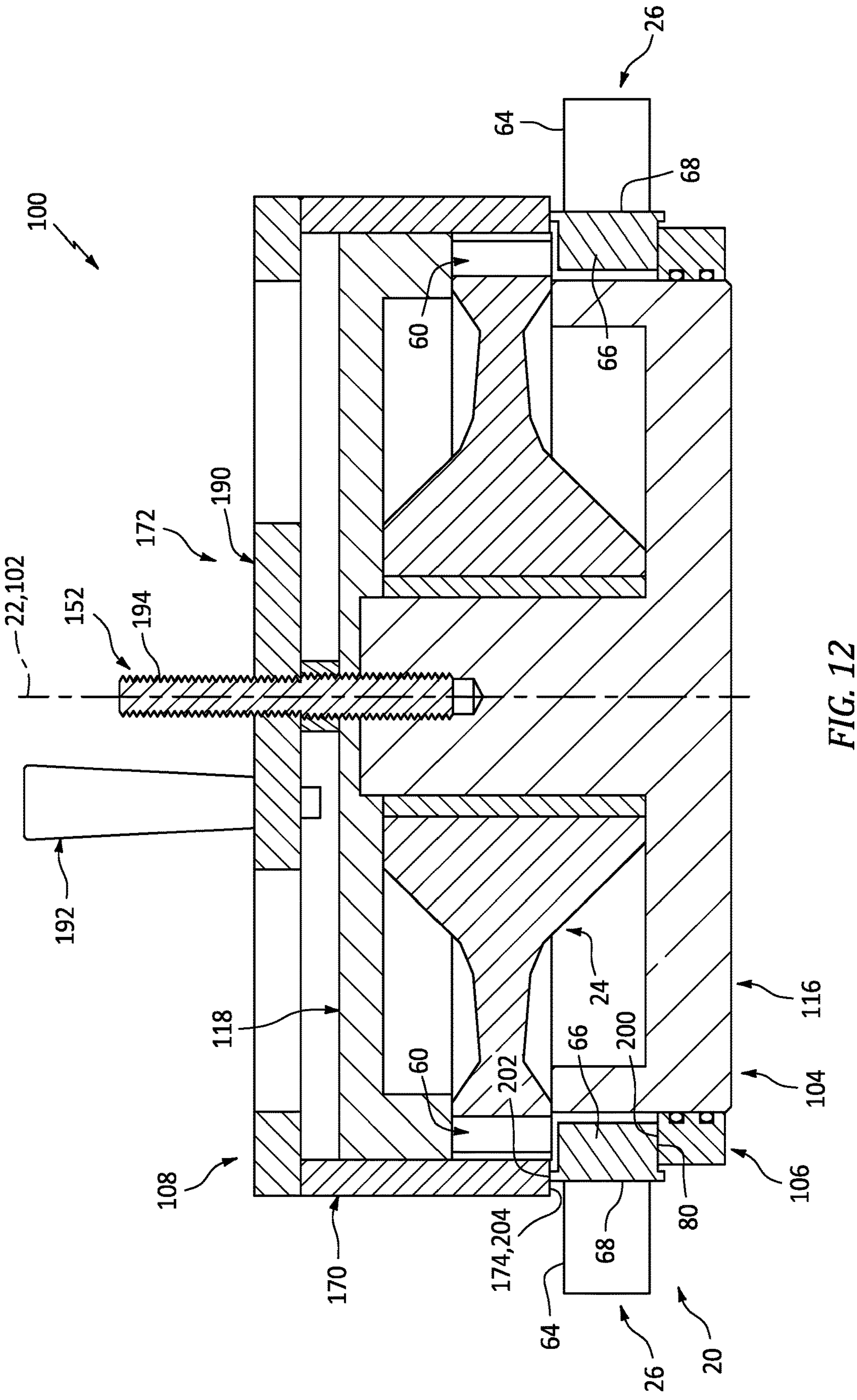
FIG. 12 is a side sectional illustration of the disassembly fixture following removal of rotor blades from the rotor disk.

In step 1110, the blade attachments 66 are simultaneously removed (e.g., unseated, extracted, etc.) from the retaining slots 60. For example, referring to FIGS. 7 and 12, the press sleeve 170 may be moved axially along the top member 118 (and slightly rotated about the axis 22, 102) by rotating the actuator member 190 about the axis 22, 102; e.g., threading the actuator member 190 further onto the threaded post 194. This axial movement of the press sleeve 170 simultaneously pushes against the axial edges 202 of the platforms 68 and thereby pushes the attachments 66 axially downward and out of the retaining slots 60. As the blade attachments 66 are pushed axially downward, the blade support structure 106 may maintain the rotor blades 26 in alignment. More particularly, the blade support structure 106 may locate all of the blade attachments 66 and, thus, all of the rotor blades 26 at a common axial position along the axis 22, 102 and the attachment first ends 80 may define a horizontal reference plane perpendicular to the axis 22, 102; e.g., the plane of the top surface 200. With this alignment, the geometries of the pockets 90 and 92 and/or the geometry of each respective seal element 28 (see FIG. 6) may allow at least a portion of that seal element 28 to lean radially outward towards (e.g., against) the respective blade platforms 68 while the rotor disk 24 is in its horizontal position on the disk support structure 104. Thus, the seal elements 28 may be less likely to get hung-up on contours of the lugs 48 at their distal lug ends 50 (see FIG. 6).

In step 1112, various components of the bladed rotor 20 may be removed from the disassembly fixture 100. For example, once the blade attachments 66 are removed from the retaining slots 60, the rotor blades 26 may be removed; e.g., taken away. This also facilitates removal of the seal elements 28 form the seal element cavities 94; e.g., see FIG. 6. The rotor disk 24 may also be released from between the bottom member 116 and the top member 118.

While the disassembly method 1100 is described with respect to disassembling the rotor blades 26 and the seal elements 28 from the rotor disk 24, it is contemplated this disassembly method 1100 may also be used to disassemble rotor blades from a rotor disk without also simultaneously disassembling the seal elements 28. Furthermore, while the disassembly fixture 100 is described with a particular orientation with respect to gravity, the present disclosure is not limited to such an exemplary arrangement. For example, in other embodiments, the disassembly fixture 100 may be vertically inverted.

In some embodiments, the bladed rotor 20 may be configured as a turbine rotor for a turbine section of the gas turbine engine. However, in other embodiments, the bladed rotor 20 may be configured as a compressor rotor for a compressor section of the gas turbine engine. In still other embodiments, the bladed rotor 20 may be configured as a fan rotor for a fan section of the gas turbine engine.

Figure 13:
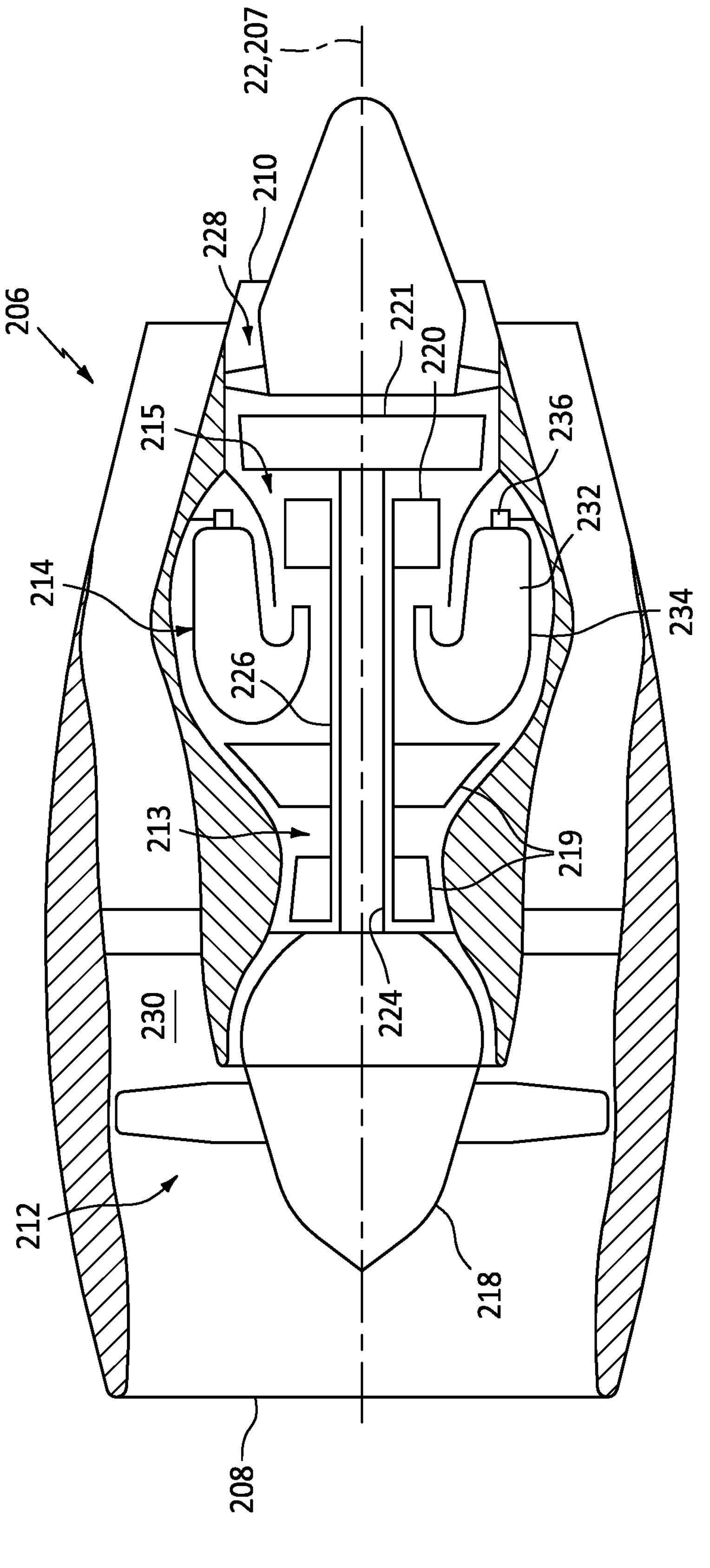
FIG. 13 is a side sectional schematic illustration of a gas turbine engine with which the bladed rotor may be arranged.

FIG. 13 illustrates an example of the gas turbine engine which may include the bladed rotor 20 described above. This gas turbine engine of FIG. 13 is configured as a turbofan gas turbine engine 206. The gas turbine engine 206 of FIG. 13 extends along an axial centerline 207 of the gas turbine engine 206 between an upstream airflow inlet 208 and a downstream airflow exhaust 210, which axial centerline 207 may be parallel with (e.g., coaxial with) the axis 22. The gas turbine engine 206 includes a fan section 212, a compressor section 213, a combustor section 214 and a turbine section 215.

The fan section 212 includes a fan rotor 218. The compressor section 213 includes a compressor rotor 219. The turbine section 215 includes a high pressure turbine (HPT) rotor 220 and a low pressure turbine (LPT) rotor 221, where the LPT rotor 221 is configured as a power turbine rotor. Each of these rotors 218-221 includes a plurality of rotor blades arranged circumferentially around and connected to one or more respective rotor disks. Any one of these rotors 218-221 may be configured as or otherwise include the bladed rotor 20.

The fan rotor 218 is connected to the LPT rotor 221 through a low speed shaft 224. The compressor rotor 219 is connected to the HPT rotor 220 through a high speed shaft 226. The low speed shaft 224 extends through a bore of the high speed shaft 226 between the fan rotor 218 and the LPT rotor 221.

During operation, air enters the gas turbine engine 206 through the airflow inlet 208. This air is directed through the fan section 212 and into a core flowpath 228 and a bypass flowpath 230. The core flowpath 228 extends sequentially through the engine sections 213-215; e.g., a core of the gas turbine engine 206. The air within the core flowpath 228 may be referred to as "core air". The bypass flowpath 230 extends through a bypass duct, which bypasses the engine core. The air within the bypass flowpath 230 may be referred to as "bypass air".

The core air is compressed by the compressor rotor 219 and directed into a (e.g., annular) combustion chamber 232 of a (e.g., annular) combustor 234 in the combustor section 214. Fuel is injected into the combustion chamber 232 via one or more of the fuel injectors 236 and mixed with the compressed core air to provide a fuel-air mixture. This fuel-air mixture is ignited and combustion products thereof flow through and sequentially cause the HPT rotor 220 and the LPT rotor 221 to rotate. The rotation of the HPT rotor 220 drives rotation of the compressor rotor 219 and, thus, compression of air received from an inlet into the core flowpath 228. The rotation of the LPT rotor 221 drives rotation of the fan rotor 218, which propels bypass air through and out of the bypass flowpath 230. The propulsion of the bypass air may account for a significant portion (e.g., a majority) of thrust generated by the turbine engine.

The bladed rotor 20 may be configured with various gas turbine engines other than the one described above. The bladed rotor 20, for example, may be configured with a geared gas turbine engine where a geartrain connects one or more shafts to one or more rotors in a fan section, a compressor section and/or any other engine section. Alternatively, the bladed rotor 20 may be configured with a gas turbine engine configured without a geartrain. The bladed rotor 20 may be configured with a geared or non-geared gas turbine engine configured with a single spool, with two spools (e.g., see FIG. 13), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for disassembling a rotor of a gas turbine engine, comprising:

providing the rotor that includes a rotor disk and a plurality of rotor blades arranged circumferentially about an axis, the plurality of rotor blades including a plurality of airfoils and a plurality of attachments that mount the plurality of rotor blades to the rotor disk, and each of the plurality of rotor blades including a respective one of the plurality of airfoils and a respective one of the plurality of attachments;

arranging a press against the rotor, the press axially engaging each of the plurality of rotor blades; and moving the press axially along the axis to simultaneously push the plurality of rotor blades and remove the plurality of attachments from a plurality of slots in the rotor disk wherein the press includes a sleeve and an actuator;

wherein the sleeve extends circumferentially around the axis, and the sleeve simultaneously axially engages each of the plurality of rotor blades; and wherein the moving of the press axially along the axis comprises pushing the sleeve using the actuator to simultaneously push the plurality of rotor blades with the sleeve and remove the plurality of attachments from the plurality of slots in the rotor disk.

2. The method of claim 1, wherein the rotor further includes a plurality of seal elements; and each of the plurality of seal elements is disposed within a respective cavity formed by and between a respective circumferentially neighboring pair of the plurality of rotor blades.

3. The method of claim 2, further comprising removing each of the plurality of seal elements from the respective cavity subsequent to the removal of the plurality of attachments from the plurality of slots.

4. The method of claim 2, wherein the plurality of seal elements comprise a first seal element; and the first seal element includes a base and a plurality of tabs connected to and projecting out from the base.

5. The method of claim 4, wherein each of the plurality of tabs projects radially inward from the base to a distal tab end.

6. The method of claim 4, wherein the rotor disk further comprises a plurality of lugs;

each of the plurality of slots is formed by and between a respective circumferentially neighboring pair of the plurality of lugs;

a first of the plurality of lugs projects radially outward to a distal lug end including a first end surface and a second end surface recessed radially inward from the first end surface; and a first of the plurality of tabs is operable to radially engage the first end surface and a second of the plurality of tabs is operable to radially engage the second end surface.

7. The method of claim 1, wherein the press is disposed on top of the rotor; and the moving of the press axially along the axis comprises moving the press axially downward along the axis to simultaneously push the plurality of rotor blades and remove the plurality of attachments from the plurality of slots.

8. The method of claim 1, wherein the plurality of rotor blades further include a plurality of platforms, and each of the plurality of rotor blades further includes a respective one of the plurality of platforms; and a planar annular surface of the press is abutted axially against axial edges of the plurality of platforms.

9. The method of claim 1, further comprising rotating a member of the press circumferentially about the axis as the press moves axially along the axis.

10. The method of claim 1, further comprising:

supporting the plurality of rotor blades on top of a blade support structure as the press simultaneously pushes the plurality of rotor blades;

the blade support structure axially engaging each of the plurality of rotor blades; and the plurality of rotor blades axially between the blade support structure and the press.

11. The method of claim 10, wherein a planar annular surface of the blade support structure is abutted axially against axial sides of the plurality of attachments.

12. The method of claim 10, further comprising:

arranging the rotor with a disk support structure;

the blade support structure slidable along and circumscribing the disk support structure.

13. The method of claim 1, further comprising:

arranging the rotor with a disk support structure;

the press slidable along and circumscribing the disk support structure.

14. The method of claim 1, wherein the rotor disk comprises a turbine disk of the gas turbine engine; and the plurality of rotor blades comprise a plurality of turbine blades of the gas turbine engine.

15. The method of claim 1, wherein, during the moving of the press axially along the axis, a member of the actuator axially engages the sleeve and rotates about the axis relative to the sleeve.

16. The method of claim 1, further comprising:

supporting the rotor disk axially between a first member of a disk support structure and a second member of the disk support structure during the disassembling of the rotor; and supporting the plurality of rotor blades using a blade support structure during the disassembling of the rotor, the blade support structure circumscribing and slidable against an outer periphery of the first member, the blade support structure extending axially along the axis to a planar annular blade support structure surface, and the planar annular blade support structure surface axially engaging the plurality of rotor blades;

wherein the press circumscribes and is slidable against an outer periphery of the second member, and the press extends axially along the axis to a planar annular press surface that engages the plurality of rotor blades.

17. The method of claim 16, wherein the actuator comprises an actuator member;

the actuator member is attached to the disk support structure by a threaded post; and a connection between the actuator member and the threaded post is configured to translate rotational movement of the actuator member about the axis into axial movement of the actuator member along the axis.

18. The method of claim 16, wherein a guide is connected to the disk support structure and projects radially into a slot in the sleeve; and at least a portion of the slot extends longitudinally within the sleeve axially along the axis and circumferentially about the axis.

* * * * *